United States Patent
Lu et al.

(10) Patent No.: US 9,778,436 B2
(45) Date of Patent: Oct. 3, 2017

(54) LENS DRIVING APPARATUS

(71) Applicant: LARGAN PRECISION CO., LTD., Taichung (TW)

(72) Inventors: Chun-Yi Lu, Taichung (TW); Te-Sheng Tseng, Taichung (TW); Wen-Hung Hsu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 218 days.

(21) Appl. No.: 14/476,929

(22) Filed: Sep. 4, 2014

(65) Prior Publication Data
US 2016/0033737 A1    Feb. 4, 2016

(30) Foreign Application Priority Data
Jul. 30, 2014 (TW) .............................. 103213501 U

(51) Int. Cl.
*G02B 7/09* (2006.01)
*G03B 3/10* (2006.01)

(52) U.S. Cl.
CPC ................. *G02B 7/09* (2013.01); *G03B 3/10* (2013.01); *G03B 2205/0069* (2013.01)

(58) Field of Classification Search
CPC .... G02B 27/646; G02B 7/023; G02B 13/001; G02B 7/09; G02B 3/10
USPC ................................................ 359/577, 824
See application file for complete search history.

(56) References Cited

U.S. PATENT DOCUMENTS

| | | | |
|---|---|---|---|
| 7,649,703 B2 | 1/2010 | Shiraki et al. | |
| 7,932,648 B2 | 4/2011 | Jung | |
| 8,009,371 B2 | 8/2011 | Sue et al. | |
| 2003/0179471 A1* | 9/2003 | Nakamura | G11B 7/0935 359/814 |
| 2010/0172041 A1* | 7/2010 | Lai | H02K 41/0356 359/824 |
| 2011/0141564 A1* | 6/2011 | Sata | G02B 7/102 359/557 |
| 2011/0176046 A1* | 7/2011 | Hu | G02B 7/08 348/335 |
| 2014/0177056 A1* | 6/2014 | Hayashi | G02B 7/08 359/557 |

* cited by examiner

*Primary Examiner* — Bumsuk Won
*Assistant Examiner* — Grant Gagnon
(74) *Attorney, Agent, or Firm* — McClure, Qualey & Rodack, LLP

(57) ABSTRACT

A lens driving apparatus includes a holder, a cover, a carrier, a first magnet, a coil, a spring, two second magnets and a hall sensor. The holder includes an opening hole. The cover is made of metal material and coupled to the holder. The carrier is movably disposed in the cover, and for coupling to a lens. The first magnet is connected to an inner side of the cover. The coil is wound around an outer side of the carrier, and adjacent to the first magnet. The spring is coupled to the carrier. The second magnets are disposed on one end of the carrier which is toward the holder. The hall sensor is for detecting a magnetic field of any one of the second magnets, wherein the magnetic field is varied according to a relative displacement between the hall sensor and the second magnet which is detected.

26 Claims, 8 Drawing Sheets

LENS DRIVING APPARATUS

RELATED APPLICATIONS

This application claims priority to Taiwan Application Serial Number 103213501, filed Jul. 30, 2014, which is herein incorporated by reference.

BACKGROUND

Technical Field

The present disclosure relates to a lens driving apparatus. More particularly, the present disclosure relates to a lens driving apparatus applicable to mobile terminals.

Description of Related Art

In general, the voice-coil motor (VCM) cooperated to an open-loop controlling method is applied to the lens for providing an auto-focusing. However, the conventional VCM cannot provide feedback signal to the actuator during moving the lens, so that the present position of the lens cannot be notified immediately. Hence, the lens should be moved to the original position before focusing every time, that is, the focusing time would be lengthened and the operation would not be fluency.

SUMMARY

According to one aspect of the present disclosure, a lens driving apparatus includes a holder, a cover, a carrier, at least one first magnet, a coil, a spring, a spacer, at least two second magnets and a hall sensor. The holder includes an opening hole. The cover is made of metal material and coupled to one side of the holder. The carrier is movably disposed in the cover, and for coupling to a lens. The first magnet is connected to an inner side of the cover. The coil is wound around an outer side of the carrier, and adjacent to the first magnet. The spring is coupled to the carrier. The spacer is located between the cover and the first magnet. The second magnets are disposed on one end of the carrier which is toward the holder. The hall sensor is for detecting a magnetic field of any one of the second magnets, wherein the magnetic field is varied according to a relative displacement between the hall sensor and the second magnet which is detected.

According to another aspect of the present disclosure, a lens driving apparatus includes a holder, a cover, a carrier, at least one first magnet, a coil, a spring, at least two second magnets, a hall sensor and a circuit board. The holder includes an opening hole. The cover is made of metal material and coupled to one side of the holder. The carrier is movably disposed in the cover, and for coupling to a lens. The first magnet is connected to an inner side of the cover. The coil is wound around an outer side of the carrier, and adjacent to the first magnet. The spring is coupled to the carrier. The second magnets are disposed on one end of the carrier which is toward the holder. The hall sensor is for detecting a magnetic field of any one of the second magnets. The hall sensor and an imaging element are connected to the circuit board, and the imaging element is for receiving an imaging light of the lens. When a component parallel to an optical axis of the lens of a distance between the hall sensor and the second magnet which is detected is d1, and a component orthogonal to the optical axis of the lens of the distance between the hall sensor and the second magnet which is detected is d2, the following condition is satisfied:

d1>d2

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
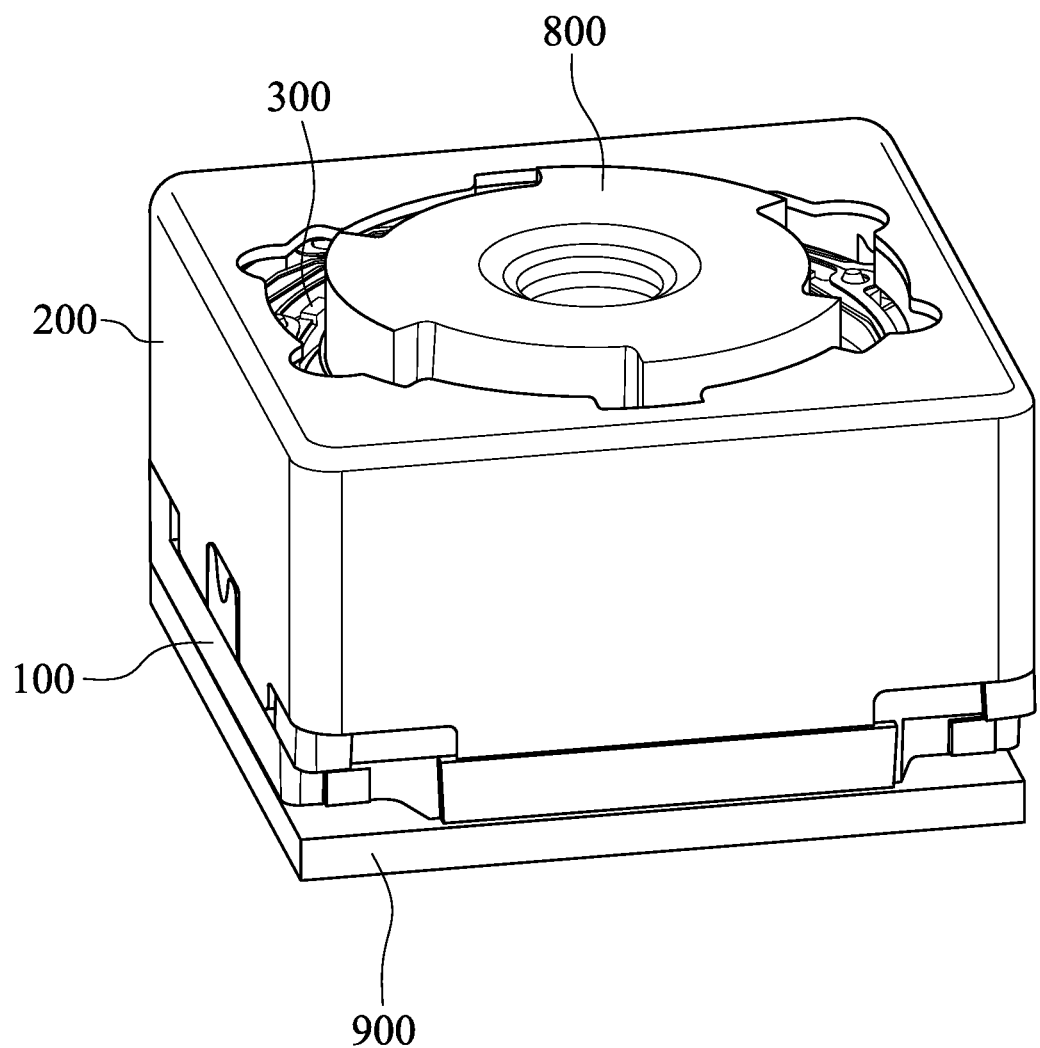
FIG. 1 shows an external schematic view of a lens driving apparatus according to the 1st embodiment of the present disclosure.
Figure 2:
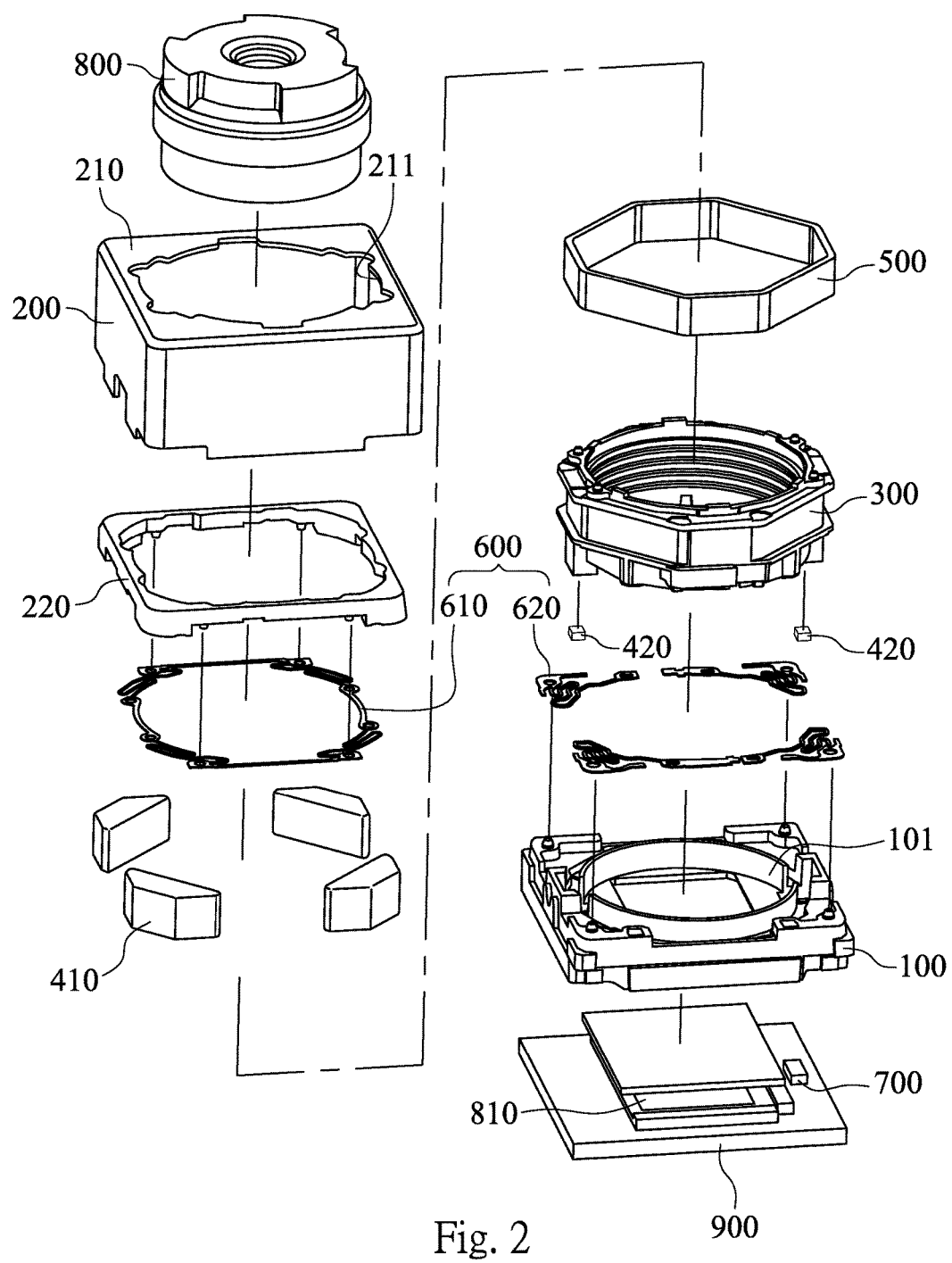
FIG. 2 shows an explode view of the lens driving apparatus according to the 1st embodiment of the present disclosure.

FIG. 1 shows an external schematic view of a lens driving apparatus according to the 1st embodiment of the present disclosure. FIG. 2 shows an explode view of the lens driving apparatus according to the 1st embodiment of the present disclosure. The lens driving apparatus includes a holder 100, a cover 200, a carrier 300, at least one first magnet 410, a coil 500, a spring 600, at least two second magnets 420, a spacer 220 and a hall sensor 700. In FIG. 1, the components of the lens driving apparatus can be covered by the cover 200, and the cover 200 is coupled to the holder 100, so that the lens driving apparatus can be applied to the electronic product, and the components can be separated from the external environment.

In detail, the holder 100 includes an opening hole 101, the cover 200 is made of metal material and coupled to one side of the holder 100. In FIG. 2, the cover 200 is cube-shaped, and a side wall of the cover 200 is composed from four wall members into closed-shape. One end of the cover 200 is an opening end, the other end of the cover 200 is an end wall 210 which is connected to the side wall and has an opening hole 211 corresponding to the opening hole 101 of the holder 100. Therefore, the lens 800 can be movable through the opening hole 101 of the holder 100 and the opening hole 211 of the cover 200.

The carrier 300 is movably disposed in the cover 200, and for coupling to a lens 800. Therefore, the lens 800 can be movable with the carrier 300.

Figure 3A:
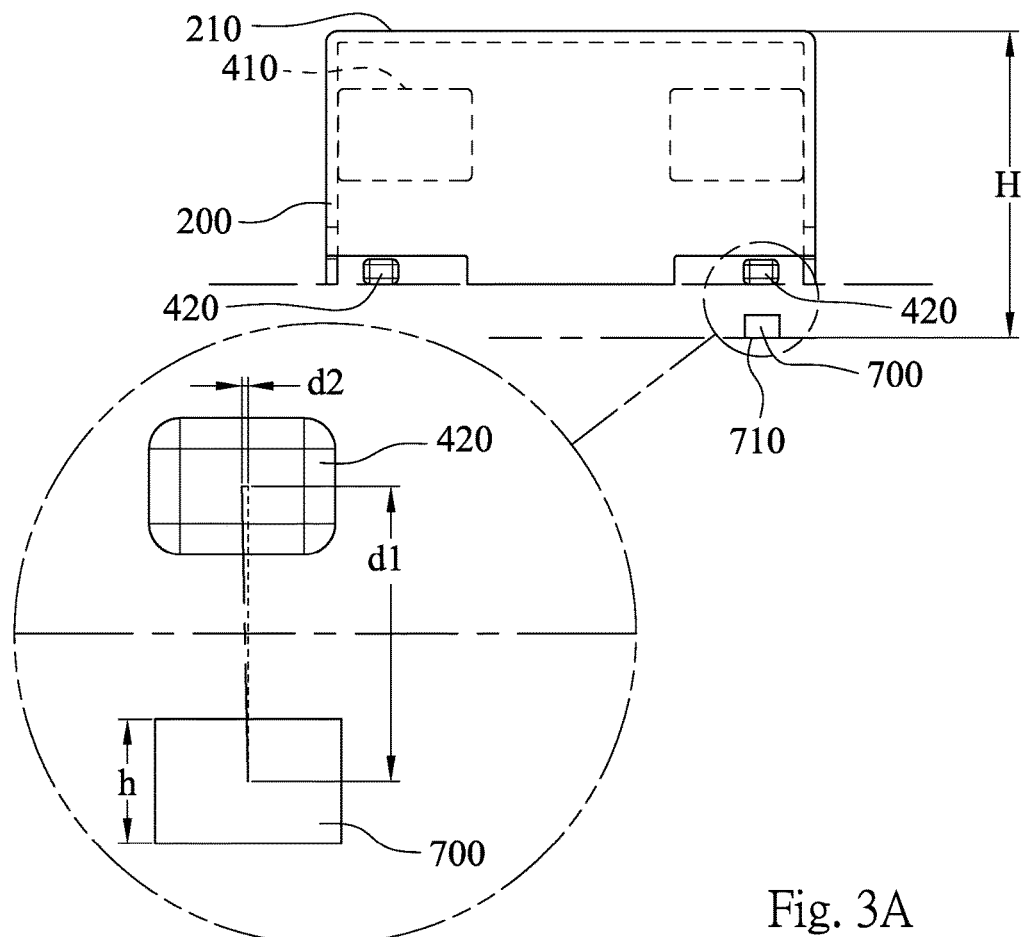
FIG. 3A shows a schematic view of the cover, the first magnets, the second magnets and the hall sensor of the lens driving apparatus according to the 1st embodiment.
Figure 3B:
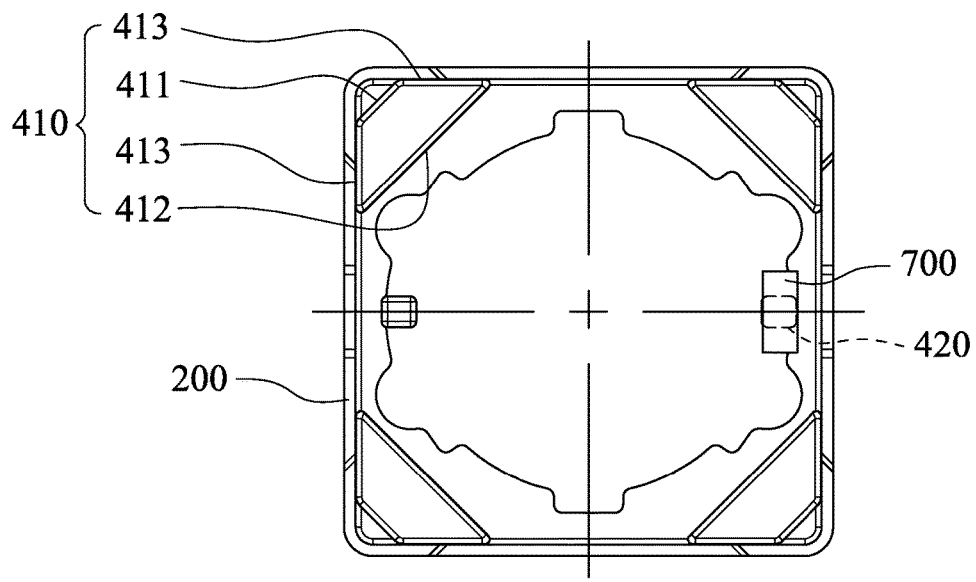
FIG. 3B shows a bottom view of the cover, the first magnets, the second magnets and the hall sensor of the lens driving apparatus according to the 1st embodiment.

The first magnet 410 is connected to an inner side of the cover 200. According to the 1st embodiment of FIG. 2, the number of the first magnet 410 is 4. FIG. 3A shows a schematic view of the cover 200, the first magnets 410, the second magnets 420 and the hall sensor 700 of the lens driving apparatus according to the 1st embodiment. FIG. 3B shows a bottom view of the cover 200, the first magnets 410, the second magnets 420 and the hall sensor 700 of the lens driving apparatus according to the 1st embodiment. In FIGS. 3A and 3B, each of the first magnets 410 is a trapezoid-shaped cylinder, precisely, is an isosceles trapezoid-shaped cylinder. That is, each of the first magnets 410 has an upper surface 411, a bottom surface 412 and two side surfaces 413, wherein the upper surface 411 and the bottom surface 412 are unequal length but parallel to each other, and the two side surfaces 413 are equal length, and connected to the upper surface 411 and the bottom surface 412, respectively. In FIG. 3B, the side surfaces 413 of each of the first magnets 410 are connected to two inner surfaces which are adjacent to each other of the inner side of the cover 200, so that the first magnets 410 are stably and equally disposed in the cover 200.

The cover 200 is for surrounding the components of the lens driving apparatus, and each component has different shape and size. However, each of the components should be securely fixed and positioned relative to the cover 200 or the other components. Therefore, the lens driving apparatus includes the spacer 220 located between the cover 200 and the first magnets 410. The spacer 220 can be connected to the inner side of the cover 200 for coupling or connecting to other components. It is favorable for the arrangement of the component which is covered and surrounded by the cover 200.

The coil 500 is wound around an outer side of the carrier 300, and adjacent to the first magnets 410. In the 1st embodiment, the coil 500 is octagon which corresponds to the outer side of the carrier 300, so that the coil 500 is stably connected around the carrier 300, and four surfaces of the coil 500 are adjacent to the bottom surface 412 of the first magnets 410, respectively. It is favorable for contributing efficiency and evenness to the interaction between the first magnets 410 and the coil 500, so that the carrier 300 can be moved stably, and the lens 800 can also be linked up stably.

Figure 4A:
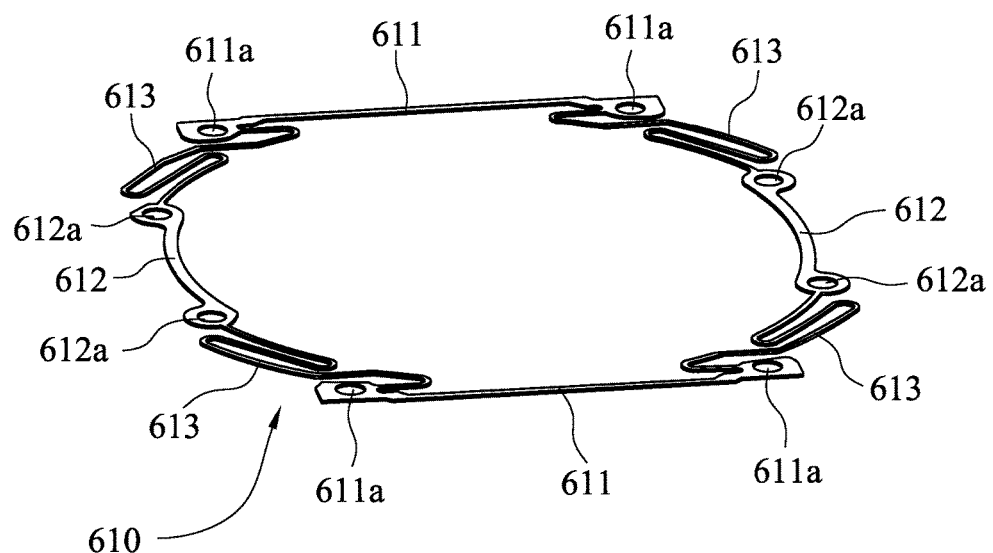
FIG. 4A shows an enlarged view of the first spring member of the lens driving apparatus of the 1st embodiment.

The spring 600 is coupled to the carrier 300 for providing an elastic supporting force. According to the 1st embodiment of the present disclosure, the spring 600 includes a first spring member 610 and a second spring member 620, which are coupled to two ends of the carrier 300, respectively. FIG. 4A shows an enlarged view of the first spring member 610 of the lens driving apparatus of the 1st embodiment. In FIG. 4A, the first spring member 610 includes two first fastening portions 611, two second fastening portions 612 and four elastic portions 613, wherein each of the first fastening portions 611 includes at least two holes 611a for coupling to the spacer 220, each of the second fastening portions 612 includes at least two holes 612a for coupling to the carrier 300, each of the elastic portions 613 is connected to one of the first fastening portions 611 and one of the second fastening portions 612 for providing the elastic supporting force. In detail, the first spring member 610 is about quadrangular, the two first fastening portions 611 and the two second fastening portions 612 can be regarded as four sides of the first spring member 610, wherein each of the first fastening portions 611 is facing each other, and each of the second fastening portions 612 is facing each other. Each of the elastic portions 613 is connected to one end of one of the first fastening portions 611 and one end of one of the second fastening portions 612. The first fastening portions 611 are connected to the spacer 220 and the second fastening portions 612 are connected to the carrier 300, so that the first spring member 610 is positioned in the cover 200. Moreover, in order to couple with different-shaped components, such as the carrier 300 and the spacer 220, etc., the first spring member 610 can include a first fastening portion 611, a second fastening portion 612 and two elastic portions 613, and each of the elastic portions 613 is connected to one end of the first fastening portion 611 and one end of the second fastening portion 612, and will not draw and describe herein.

Figure 4B:
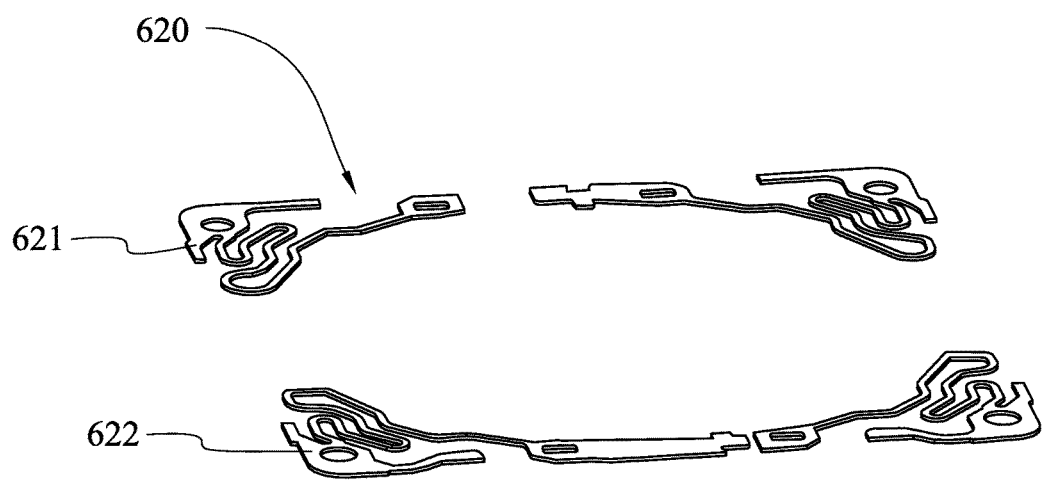
FIG. 4B shows an enlarged view of the second spring member of the lens driving apparatus according to the 1st embodiment.

FIG. 4B shows an enlarged view of the second spring member 620 of the lens driving apparatus according to the 1st embodiment. The second spring member 620 includes a first portion 621 and a second portion 622, wherein the first portion 621 and the second portion 622 are separated from each other, coupled to the end of the carrier 300 which is toward the holder 100 and located on a same horizontal plane.

The second magnets 420 are disposed on the end of the carrier 300 which is toward the holder 100, and are movable simultaneously with the carrier 300, wherein a magnetic polarization direction of each of the second magnets 420 is parallel to an optical axis of the lens 800, and is orthogonal to a magnetic polarization direction of the first magnet 410. The magnetic field of the first magnets 410 and the magnetic field of the second magnets 420 are not interacting with each other. The hall sensor 700 is for detecting a magnetic field of any one of the second magnets 420, wherein the magnetic field is varied according to a relative displacement between the hall sensor 700 and the second magnet 420 which is detected. Therefore, the voltage signal as a feedback can be provided, and the lens 800 can be linked up with the carrier 300 to a predetermined position. The carrier 300 has no need to move back to the original position, and then moves to the predetermined position. In the 1st embodiment, the number of the second magnets 420 is two, and the two second magnets 420 are symmetrically disposed on the end of the carrier 300 about the optical axis of the lens 800, but are not limited thereto.

In FIG. 3A, when a thickness parallel to an optical axis of the lens 800 of the hall sensor 700 is h, the following condition is satisfied: h<1.0 mm. Therefore, the mechanical complexity can be reduced, and the assembling convenience can be increased. Preferably, the following condition is satisfied: h<0.6 mm.

In the 1st embodiment of the present disclosure, the lens driving apparatus can further include a circuit board 900, which is embedded into the other side of the holder 100. The hall sensor 700 and an imaging element 810 are connected to the circuit board 900, and the imaging element 810 is for receiving an imaging light of the lens 800, the imaging element 810 has 8 million pixels or above. In detail, the different voltage signal represented as the present position on the optical axis of the lens can be output due to the relative displacement between the hall sensor 700 and the second magnet 420, and the distance between the present position and the predetermined position for focusing can be provided after the circuit board 900 receives the voltage signal, then the outputting current can be provided to the coil 500 for moving the carrier 300 and the lens 800 to the predetermined position for focusing.

In FIG. 3A, when a vertical distance between an outermost side of the end wall 210 of the cover 200 and a side wall 710 of the hall sensor 700 which is connected to the circuit board 900 is H, and the following condition is satisfied: 3.4 mm<H<5.8 mm. Therefore, the sensitivity for detecting the magnetic field can be maintained, and the focusing time can be shortened.

The movement of the lens 800 which is linked up with the carrier 300 is adjusted corresponding to the current due to the variation of the magnetic field according to a relative displacement between the hall sensor 700 and the second magnet 420 which is detected. Therefore, the detection of the magnetic field depends on the relative position between the hall sensor 700 and the second magnets 420. In FIG. 3A, when a component parallel to an optical axis of the lens 800 of a distance between the center of the hall sensor 700 and the second magnet 420 which is detected is d1, and a component orthogonal to the optical axis of the lens 800 of the distance between the hall sensor 700 and the second magnet 420 which is detected is d2, the following condition is satisfied: d1>d2. Therefore, the compact size of the lens driving apparatus can be maintained.

Furthermore, when the component parallel to an optical axis of the lens 800 of a distance between the center of the hall sensor 700 and the second magnet 420 which is detected is d1, the following condition is satisfied: d1<1.4 mm. Preferably, the following condition is satisfied: d1<1.15 mm.

In the 1st embodiment of the present disclosure, the number of the second magnets 420, the vertical distance between an outermost side of the end wall 210 of the cover 200 and a side wall 710 of the hall sensor 700 which is connected to the circuit board 900 (H), the thickness parallel to an optical axis of the lens 800 of the hall sensor 700 (h), the component parallel to an optical axis of the lens 800 of a distance between the center of the hall sensor 700 and the second magnet 420 which is detected (d1), and the pixel of the imaging element 810 are listed in the following Table 1.

TABLE 1

| 1st Embodiment | | | | |
|---|---|---|---|---|
| the number of the second magnets | H (mm) | h (mm) | d1 (mm) | the pixel of the imaging element |
| 2 | 4.885 | 0.55 | 1.08 | 8 million |

Figure 5A:
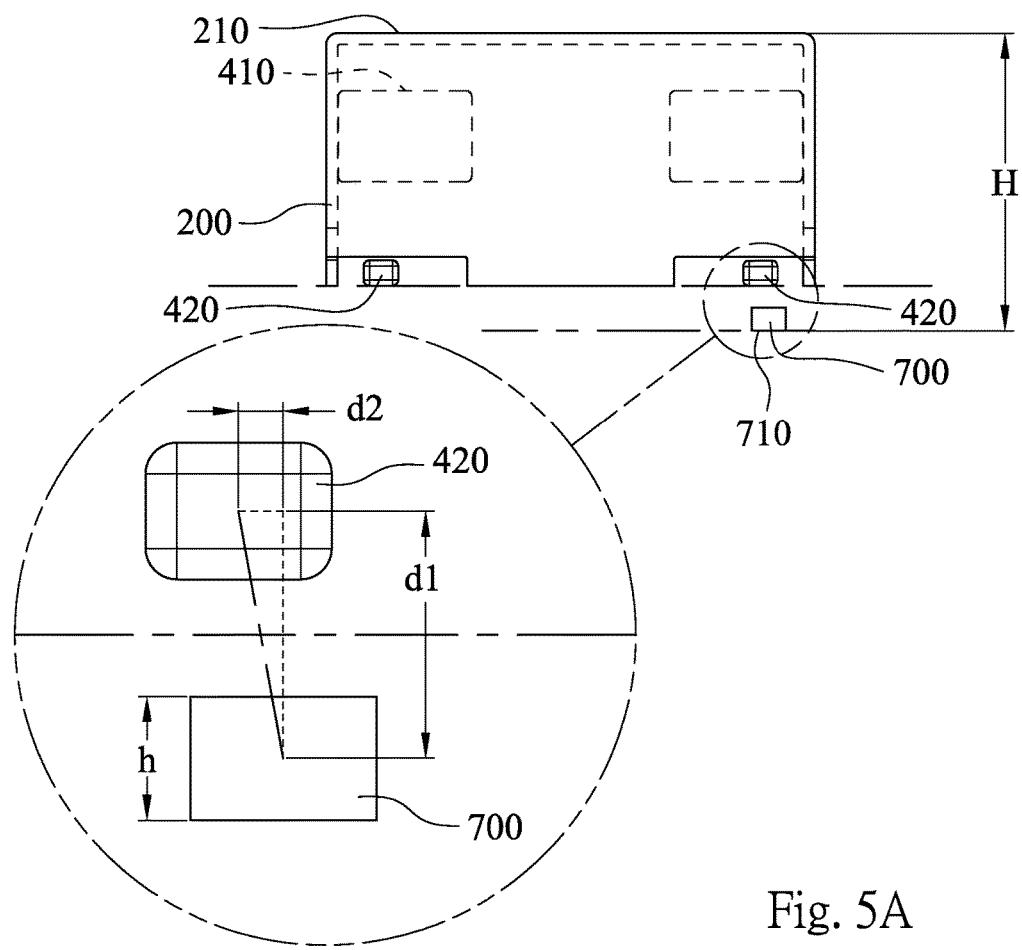
FIG. 5A shows a schematic view of the second magnets and the hall sensor of the lens driving apparatus according to the 2nd embodiment.
Figure 5B:
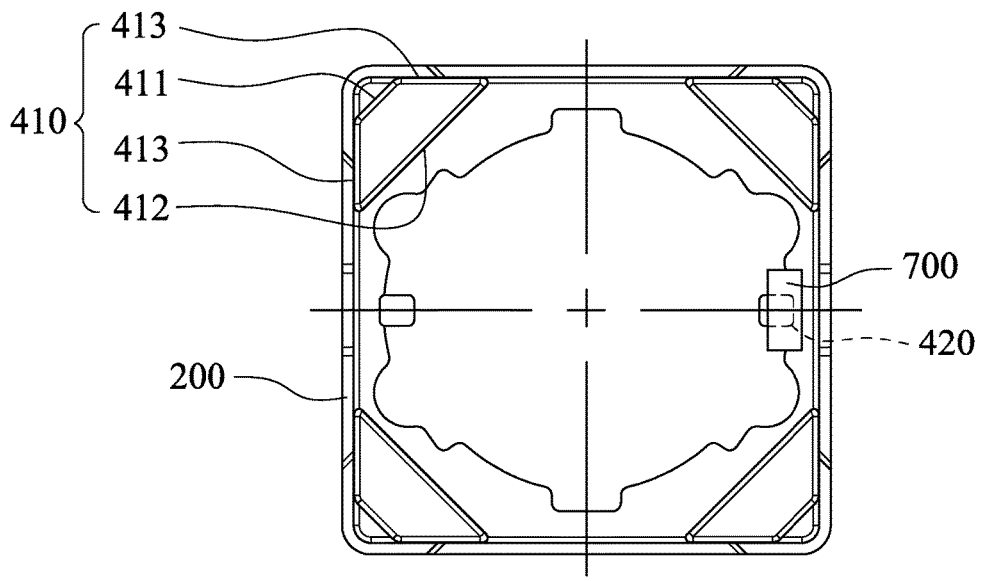
FIG. 5B shows a bottom view of the second magnets and the hall sensor of the lens driving apparatus according to the 2nd embodiment.

FIG. 5A shows a schematic view of the second magnets 420 and the hall sensor 700 of the lens driving apparatus according to the 2nd embodiment. FIG. 5B shows a bottom view of the second magnets 420 and the hall sensor 700 of the lens driving apparatus according to the 2nd embodiment. In FIGS. 5A and 5B, when a component parallel to an optical axis of the lens 800 of a distance between the center of the hall sensor 700 and the second magnet 420 which is detected is d1, and a component orthogonal to the optical axis of the lens 800 of the distance between the hall sensor 700 and the second magnet 420 which is detected is d2, wherein the component orthogonal to the optical axis of the lens 800 of the distance between the hall sensor 700 and the second magnet 420 which is detected (d2) is increased, however, the following condition is also satisfied: d1>d2.

In the 2nd embodiment of the present disclosure, the number of the second magnets 420, the vertical distance between an outermost side of the end wall 210 of the cover 200 and a side wall 710 of the hall sensor 700 which is connected to the circuit board 900 (H), the thickness parallel to an optical axis of the lens 800 of the hall sensor 700 (h), the component parallel to an optical axis of the lens 800 of a distance between the center of the hall sensor 700 and the second magnet 420 which is detected (d1), and the pixel of the imaging element 810 are listed in the following Table 2.

TABLE 2

| 2nd Embodiment | | | | |
|---|---|---|---|---|
| the number of the second magnets | H (mm) | h (mm) | d1 (mm) | the pixel of the imaging element |
| 2 | 4.300 | 0.32 | 0.82 | 16 million |

Figure 6A:
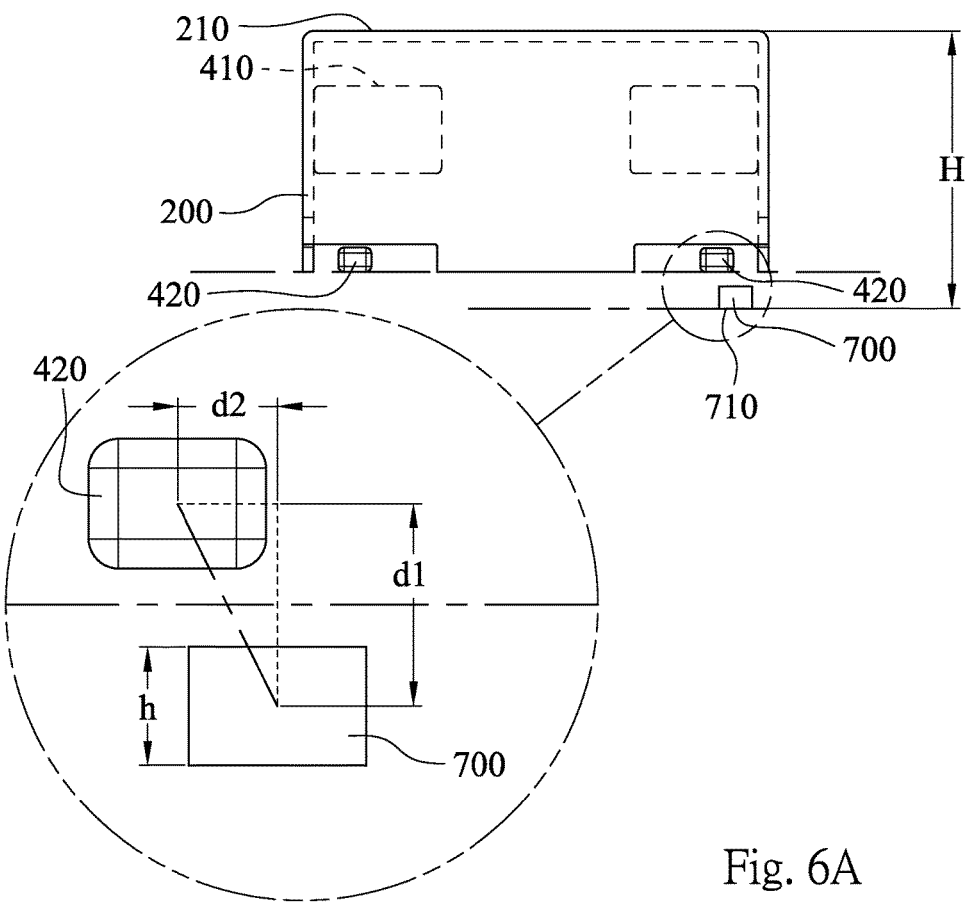
FIG. 6A shows a schematic view of the second magnets and the hall sensor of the lens driving apparatus according to the 3rd embodiment.
Figure 6B:
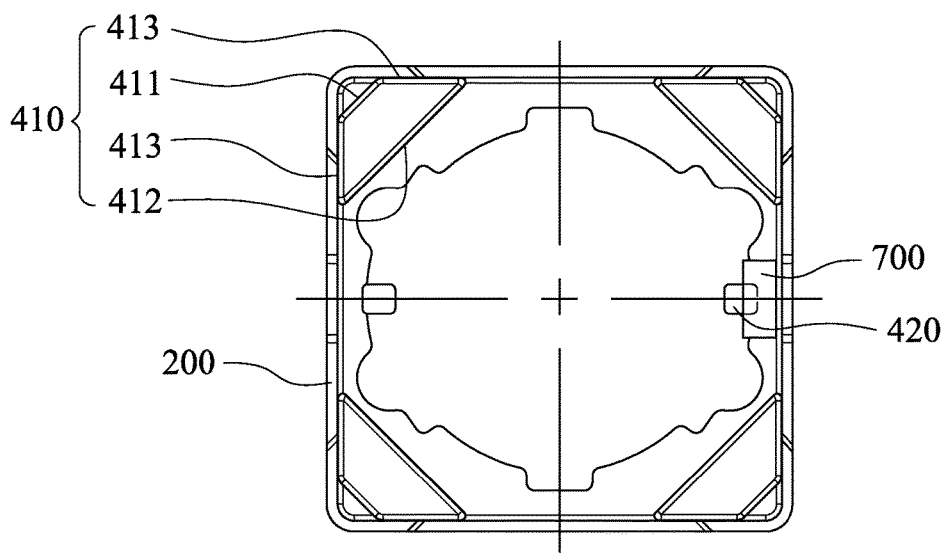
FIG. 6B shows a bottom view of the second magnets and the hall sensor of the lens driving apparatus according to the 3rd embodiment.

FIG. 6A shows a schematic view of the second magnets 420 and the hall sensor 700 of the lens driving apparatus according to the 3rd embodiment. FIG. 6B shows a bottom view of the second magnets 420 and the hall sensor 700 of the lens driving apparatus according to the 3rd embodiment. In FIGS. 6A and 6B, when a component parallel to an optical axis of the lens 800 of a distance between the center of the hall sensor 700 and the second magnet 420 which is detected is d1, and a component orthogonal to the optical axis of the lens 800 of the distance between the hall sensor 700 and the second magnet 420 which is detected is d2, wherein the component orthogonal to the optical axis of the lens 800 of the distance between the hall sensor 700 and the second magnet 420 which is detected (d2) is further increased, however, the following condition is also satisfied: d1>d2.

In the 3rd embodiment of the present disclosure, the number of the second magnets 420, the vertical distance between an outermost side of the end wall 210 of the cover 200 and a side wall 710 of the hall sensor 700 which is connected to the circuit board 900 (H), the thickness parallel to an optical axis of the lens 800 of the hall sensor 700 (h), the component parallel to an optical axis of the lens 800 of a distance between the center of the hall sensor 700 and the second magnet 420 which is detected (d1), and the pixel of the imaging element 810 are listed in the following Table 3.

TABLE 3

| 3rd Embodiment | | | | |
|---|---|---|---|---|
| the number of the second magnets | H (mm) | h (mm) | d1 (mm) | the pixel of the imaging element |
| 2 | 4.370 | 0.65 | 0.64 | 13 million |

Figure 7A:
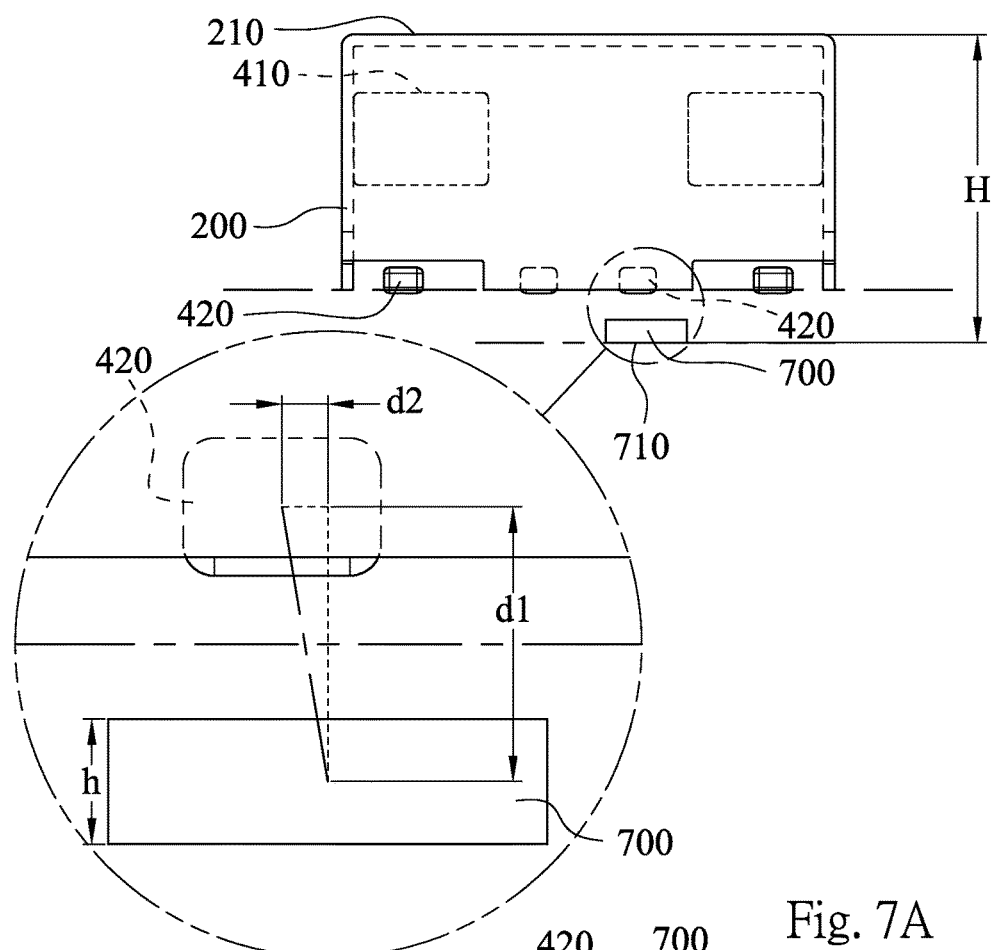
FIG. 7A shows a schematic view of the second magnets and the hall sensor of the lens driving apparatus according to the 4th embodiment.
Figure 7B:
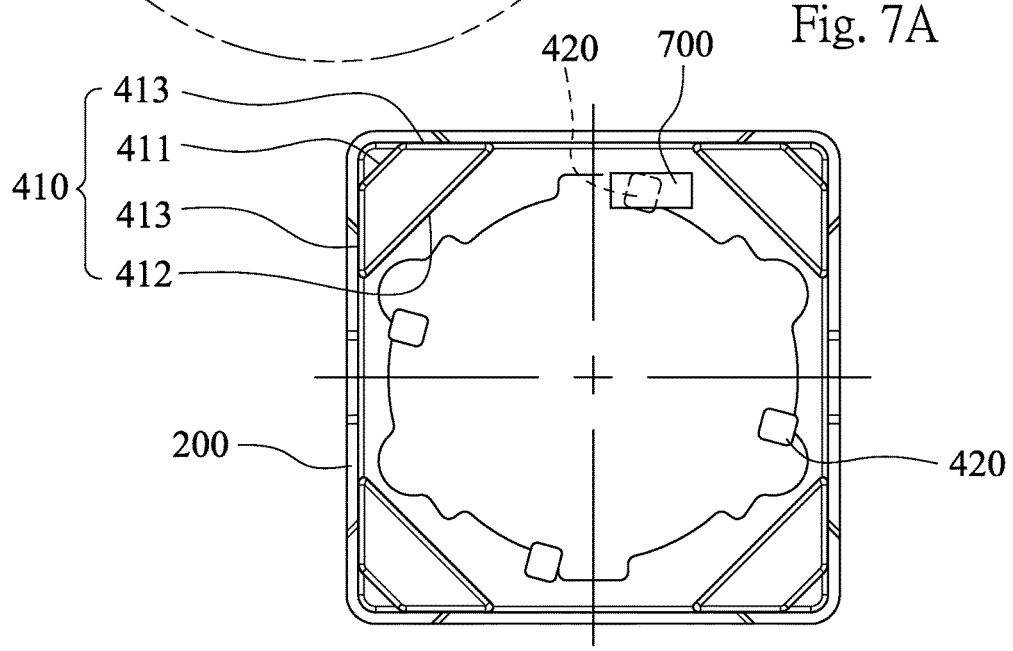
FIG. 7B shows a bottom view of the second magnets and the hall sensor of the lens driving apparatus according to the 4th embodiment.

FIG. 7A shows a schematic view of the second magnets 420 and the hall sensor 700 of the lens driving apparatus according to the 4th embodiment. FIG. 7B shows a bottom view of the second magnets 420 and the hall sensor 700 of the lens driving apparatus according to the 4th embodiment. In FIGS. 7A and 7B, when a component parallel to an optical axis of the lens 800 of a distance between the center of the hall sensor 700 and the second magnet 420 which is detected is d1, and a component orthogonal to the optical axis of the lens 800 of the distance between the hall sensor 700 and the second magnet 420 which is detected is d2, the following condition is satisfied: d1>d2.

Figure 7C:
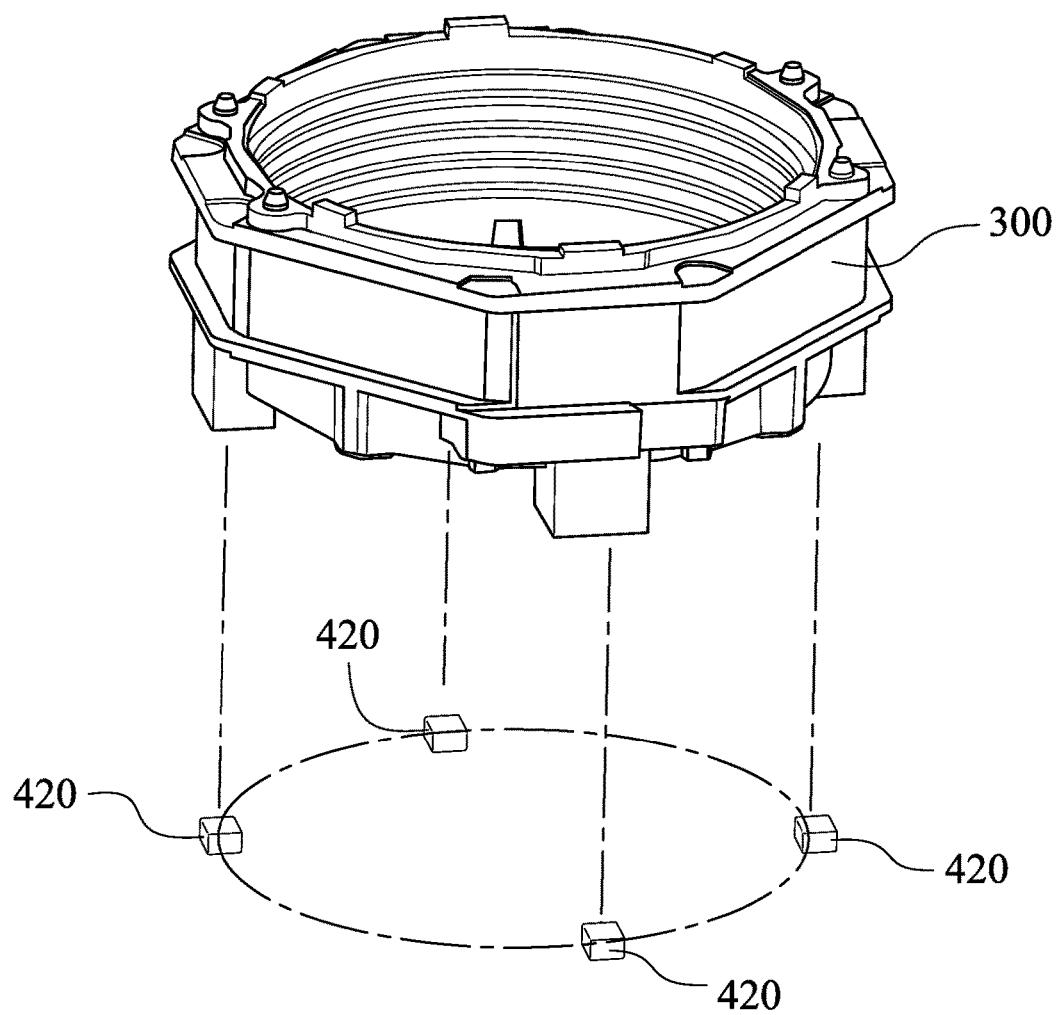
FIG. 7C shows the carrier and the second magnets of the lens driving apparatus according to the 4th embodiment.

FIG. 7C shows the carrier 300 and the second magnets 420 of the lens driving apparatus according to the 4th embodiment. In FIG. 7C, the number of the second magnets 420 is four, and every two second magnets 420 which are adjacent to each other are equidistantly disposed on the end of the carrier 300 in a circumferential direction. Furthermore, the number of the second magnets 420 can be two to six, and even number is better, but is not limited thereto. Therefore, the balance of the lens driving apparatus can be enhanced.

In the 4th embodiment of the present disclosure, the number of the second magnets 420, the vertical distance between an outermost side of the end wall 210 of the cover 200 and a side wall 710 of the hall sensor 700 which is connected to the circuit board 900 (H), the thickness parallel to an optical axis of the lens 800 of the hall sensor 700 (h), the component parallel to an optical axis of the lens 800 of a distance between the center of the hall sensor 700 and the second magnet 420 which is detected (d1), and the pixel of the imaging element 810 are listed in the following Table 4.

TABLE 4

| 4th Embodiment | | | |
|---|---|---|---|
| the number of the second magnets | H (mm) | h (mm) | d1 (mm) | the pixel of the imaging element |
| 4 | 5.230 | 0.45 | 0.98 | 20 million |

Therefore, the movement of the lens 800 which is linked up with the carrier 300 is adjusted corresponding to the current due to the variation of the magnetic field according to a relative displacement between the hall sensor 700 and the second magnet 420 which is detected. Hence, the focusing time can be saved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A lens driving apparatus, comprising:
a holder, comprising an opening hole;
a cover made of metal material and coupled to one side of the holder;
a carrier movably disposed in the cover, and for coupling to a lens;
at least one first magnet connected to an inner side of the cover;
a coil wound around an outer side of the carrier, and adjacent to the first magnet;
a spring coupled to the carrier;
a spacer located between the cover and the first magnet;
at least two second magnets disposed on one end of the carrier which is toward the holder; and
a hall sensor for detecting a magnetic field of at least one of the second magnets, wherein the magnetic field is varied according to a relative displacement between the hall sensor and the second magnet which is detected;
wherein a magnetic polarization direction of at least one of the second magnets is parallel to an optical axis of the lens, and is orthogonal to a magnetic polarization direction of the first magnet;
wherein the first magnet is an isosceles trapezoid-shaped cylinder, a bottom surface of the first magnet is adjacent to the coil, and two side surfaces of the first magnet are fixedly connected to the inner side of the cover;
wherein a component parallel to the optical axis of the lens of a distance between the hall sensor and the second magnet which is detected by the Hall sensor is d1, and the following condition is satisfied:

d1<1.4 mm.

2. The lens driving apparatus of claim 1, wherein a side wall of the cover is closed-shape, one end of the cover is an opening end, the other end of the cover is an end wall which is connected to the side wall and has an opening hole, and the spacer is adjacent to the end wall.

3. The lens driving apparatus of claim 1, wherein a number of the second magnets is two, and the two second magnets are symmetrically disposed on the end of the carrier about the optical axis of the lens.

4. The lens driving apparatus of claim 1, wherein a number of the second magnets is two to six, and every two second magnets which are adjacent to each other are equidistantly disposed on the end of the carrier in a circumferential direction.

5. The lens driving apparatus of claim 4, further comprising:
a circuit board, embedded into the other side of the holder, wherein the hall sensor and an imaging element are connected to the circuit board, and the imaging element is for receiving an imaging light of the lens.

6. The lens driving apparatus of claim 5, wherein one end of the cover is an end wall which is connected to the side wall and has an opening hole, a vertical distance between an outermost side of the end wall of the cover and a side wall of the hall sensor which is connected to the circuit board is H, and the following condition is satisfied:

3.4 mm<H<5.8 mm.

7. The lens driving apparatus of claim 1, wherein the spring comprises:
a first spring member coupled to the other end of the carrier; and
a second spring member coupled to the end of the carrier which is toward the holder.

8. The lens driving apparatus of claim 7, wherein the first spring member comprises:
at least one first fastening portion coupled to the spacer;
at least one second fastening portion coupled to the carrier; and
at least two elastic portions, each of the elastic portions connected to one end of the first fastening portion and one end of the second fastening portion, and for providing an elastic supporting force.

9. The lens driving apparatus of claim 8, wherein the first fastening portion of the first spring member comprises at least two holes, and the second fastening portion of the first spring member comprises at least two holes.

10. The lens driving apparatus of claim 7, wherein the second spring member comprises:
a first portion; and
a second portion, wherein the first portion and the second portion are separated from each other and located on a same horizontal plane.

11. The lens driving apparatus of claim 10, wherein a thickness parallel to the optical axis of the lens of the hall sensor is h, and the following condition is satisfied:

h<1.0 mm.

12. A lens driving apparatus, comprising:
a holder, comprising an opening hole;
a cover made of metal material and coupled to one side of the holder;
a carrier movably disposed in the cover, and for coupling to a lens;
at least one first magnet connected to an inner side of the cover;
a coil wound around an outer side of the carrier, and adjacent to the first magnet;
a spring coupled to the carrier;
at least two second magnets disposed on one end of the carrier which is toward the holder;
a hall sensor for detecting a magnetic field of at least one of the second magnets; and
a circuit board, wherein the hall sensor and an imaging element are connected to the circuit board, and the imaging element is for receiving an imaging light of the lens;
wherein the first magnet is an isosceles trapezoid-shaped cylinder, a bottom surface of the first magnet is adjacent to the coil, and two side surfaces of the first magnet are fixedly connected to the inner side of the cover;
wherein, a magnetic polarization direction of at least one of the second magnets is parallel to an optical axis of the lens, and is orthogonal to a magnetic polarization direction of the first magnet, a component parallel to the optical axis of the lens of a distance between the hall sensor and the second magnet which is detected by the Hall sensor is d1, a component orthogonal to the optical axis of the lens of the distance between the hall sensor and the second magnet is d2, and the following condition is satisfied:

d1>d2.

13. The lens driving apparatus of claim 12, wherein a number of the second magnets is two, and the two second magnets are symmetrically disposed on the end of the carrier about the optical axis of the lens.

14. The lens driving apparatus of claim 12, wherein the coil is octagon.

15. The lens driving apparatus of claim 14, wherein the component parallel to the optical axis of the lens of the distance between the hall sensor and the second magnet which is detected by the Hall sensor is d1, and the following condition is satisfied:

d1<1.4 mm.

16. The lens driving apparatus of claim 15, wherein the component parallel to the optical axis of the lens of the distance between the hall sensor and the second magnet which is detected by the Hall sensor is dl, and the following condition is satisfied:

d1<1.15 mm.

17. The lens driving apparatus of claim 12, wherein the spring comprises:
a first spring member coupled to the other end of the carrier; and
a second spring member coupled to the end of the carrier which is toward the holder.

18. The lens driving apparatus of claim 17, wherein the imaging element has 8 million pixels or above.

19. The lens driving apparatus of claim 17, wherein the second spring member comprises:
a first portion; and
a second portion, wherein the first portion and the second portion are separated from each other and located on a same horizontal plane.

20. The lens driving apparatus of claim 17, further comprising:
a spacer located between the cover and the first magnet, wherein the first spring member comprises:
at least one first fastening portion coupled to the spacer;
at least one second fastening portion coupled to the carrier; and
at least two elastic portions, each of the elastic portions connected to one end of the first fastening portion and one end of the second fastening portion, and for providing an elastic supporting force.

21. The lens driving apparatus of claim 20, wherein the first fastening portion of the first spring member comprises at least two holes, and the second fastening portion of the first spring member comprises at least two holes.

22. The lens driving apparatus of claim 12, wherein a side wall of the cover is closed-shape, one end of the cover is an opening end, the other end of the cover is an end wall which is connected to the side wall and has an opening hole.

23. The lens driving apparatus of claim 22, wherein a number of the second magnets is two to six, and every two second magnets which are adjacent to each other are equidistantly disposed on the end of the carrier in a circumferential direction.

24. The lens driving apparatus of claim 23, wherein a vertical distance between an outermost side of the end wall of the cover and a side wall of the hall sensor which is connected to the circuit board is H, and the following condition is satisfied:

3.4 mm<H<5.8 mm.

25. The lens driving apparatus of claim 23, wherein a thickness parallel to the optical axis of the lens of the hall sensor is h, and the following condition is satisfied:

h<1.0 mm.

26. The lens driving apparatus of claim 25, wherein the thickness parallel to the optical axis of the lens of the hall sensor is h, and the following condition is satisfied:

h<0.6 mm.

* * * * *